US006804340B2

(12) United States Patent
Howard et al.

(10) Patent No.: US 6,804,340 B2
(45) Date of Patent: Oct. 12, 2004

(54) TELECONFERENCING SYSTEM

(75) Inventors: Michael D. Howard, Westlake Village, CA (US); Ronald R. Burns, Irvine, CA (US); Craig A. Lee, Los Angeles, CA (US); Michael J. Daily, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 516 days.

(21) Appl. No.: 09/848,143

(22) Filed: May 3, 2001

(65) Prior Publication Data

US 2002/0181686 A1 Dec. 5, 2002

(51) Int. Cl.[7] .............................................. H04M 3/42
(52) U.S. Cl. ........................... 379/202.01; 379/201.01; 379/207.01
(58) Field of Search ..................... 379/201.01, 202.01, 379/203.01, 205.01, 204.01, 206.01, 207.01, 158, 114.07, 93.21, 93.15, 221.07; 370/260, 261, 262, 263, 264, 265, 266, 267, 468

(56) References Cited

U.S. PATENT DOCUMENTS

| | | | |
|---|---|---|---|
| 4,456,792 A | | 6/1984 | Courtney-Pratt |
| 4,757,493 A | | 7/1988 | Yuen et al. |
| 5,457,685 A | * | 10/1995 | Chanpion ..................... 370/62 |
| 6,141,597 A | * | 10/2000 | Botzko ......................... 700/94 |
| 6,178,314 B1 | * | 1/2001 | Whikehart et al. ...... 455/188.1 |
| 6,611,872 B1 | * | 8/2003 | McCanne ................... 709/238 |

FOREIGN PATENT DOCUMENTS

| | | |
|---|---|---|
| JP | 411055641 A | 2/1999 |
| WO | WO 00/72560 | 11/2000 |

OTHER PUBLICATIONS

Terrence G. Champion, Multi–speaker Conferencing over Narrowband Channels, 1991, pp. 1220–1223.
Jens Nedergaard and Henrik Nielsen, An All–Digital Audiconference System, Mar. 5, 1990, pp. 163–172.

* cited by examiner

Primary Examiner—William J. Deane, Jr.
(74) Attorney, Agent, or Firm—Daly, Crowley & Mofford, LLP.

(57) ABSTRACT

A system and method for encoding the speech of multiple speakers for transmission on a limited medium such as ISDN or ADSL. The system and method encode one or more "dominant" speakers on a first channel, and merges all other speakers into a second channel. A "dominant" speaker may be defined according to the needs of the application, but intuitively it is a speaker in a collaboration session who has the "floor". The method and system transmit speech through a teleconferencing system having an available bandwidth. Speech from a speaking one, or ones, of the plurality of participants is passed while speech from non-speaking participants is rejected. The system responds to the speech from the one, or ones of the speaking participants passed by the speech detector, and determines which of the detected speaking one, or ones, thereof is a dominant speaker. The system allocates one portion of the available bandwidth to the determined dominant speaker and merges the non-dominant participant(s) onto a second bandwidth portion of the available bandwidth.

22 Claims, 4 Drawing Sheets

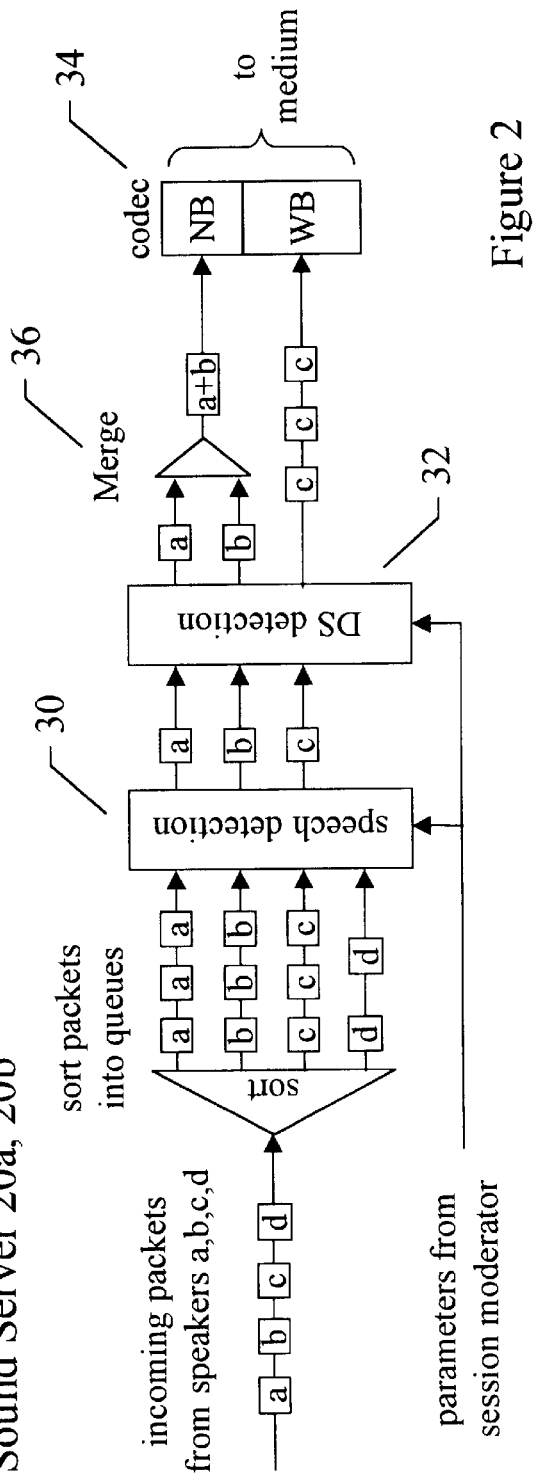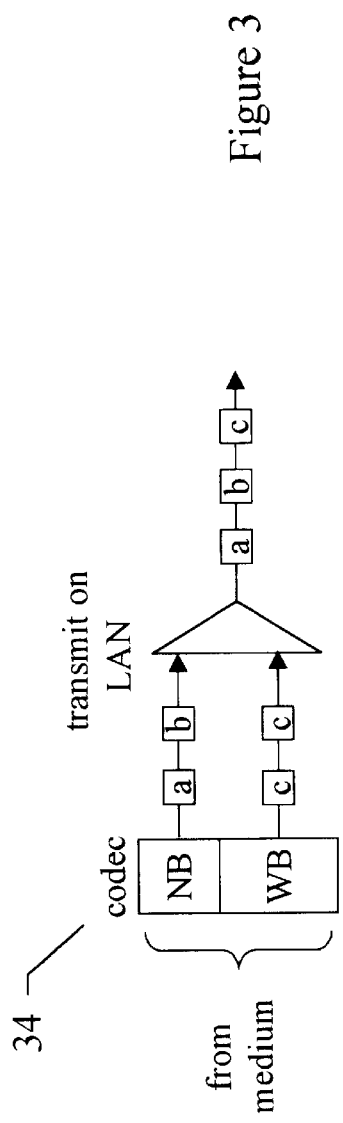

DS = Dominant Speaker
SM = session moderator

TELECONFERENCING SYSTEM

BACKGROUND OF THE INVENTION

This invention relates generally to teleconferencing systems and more particularly to systems for encoding speech of multiple speakers for transmission on a limited bandwidth such as ISDN or DSL telephone communication systems.

As is known in the art, teleconferencing systems are in wide use today to enable people at remote locations to communicate through the PSTN. The bandwidth of a normal POTS PTSN has been limited to about 4 kHz. Today, wider bandwidths are possible on the PTSN using ISDN or DSL, such as ADSL.

In many applications, it is desirable to have better than so-called "toll quality speech" (i.e., that which is provided on a POTS having a 4 kHz limited bandwidth). In these applications, the participants need to hear fricatives and plosive utterances that require frequencies above 4 kHz. Some examples would be where the speaker has a strong accent, or is speaking about technical topics in which accuracy is important, or is teaching a foreign language.

SUMMARY OF THE INVENTION

In accordance with the present invention, a teleconferencing system is provided having a predetermined, limited (i.e. available) bandwidth. The system includes a dominant speaker detector, for determining which of a plurality of participants is at least one dominant speaker. A bandwidth allocator is provided for allocating a first portion of the available bandwidth to the at least one determined dominant speaker and allocating a second portion of the available bandwidth to one or more of the non-dominant speaker participants.

In accordance with one embodiment of the invention, the first portion is wider than the second portion.

With such system, the speech of multiple speakers is encoded for transmission on a limited bandwidth medium, such as, for example, ISDN or ADSL, with selected at least one of the speakers being transmitted on different at least one portion of the limited bandwidth. The system encodes one or more "dominant" speakers on a first channel, and merges all other speakers into a second channel. A "dominant" speaker may be defined according to the needs of the application, but intuitively it is a speaker in a collaboration session who has the "floor". Each speaker at any moment is a candidate to become "dominant", replacing a current dominant speaker, "speaking" is distinguished from audible attempts to interrupt the current speaker. The utterances of non-dominant speakers may not be intelligible when merged together on a common second channel, but can still serve their conversational purpose of signaling that another speaker wants the "floor". This approach would be most suitable for conferences which will have multiple speakers who take turns, but can also cover cases in which there are more than one dominant speaker.

In one embodiment, the first speaker to break silence is placed on a wideband channel and if someone else talks at the same time the second speaker is placed on a new channel. The new channel, may be another wideband channel or a narrowband channel. The process repeats until the available bandwidth is consumed.

In one embodiment, speakers who cannot be accommodated on individual wideband channels are summed onto a single narrowband channel.

In accordance with another feature of the invention, a teleconferencing system is provided having an available bandwidth. The system includes a plurality of microphones, each one being associated with a corresponding one of a plurality of participants. A dominant speaker detector is responsive to signals produced by the microphones and determines which of a plurality of participants is a dominant speaker. A bandwidth allocator allocates a wider portion of the available bandwidth to the detected dominant speaker and a narrower portion of the available bandwidth to a non-dominant speaker participant.

In one embodiment, the teleconferencing system dominant speaker detector responds to the speech from the one, or ones, of the speaking participants passed by the speaker detector, determines which of the detected speaking one, or ones, thereof is a dominant speaker, and produces a signal indication of the one of the participants determined to be the dominant speaker. The system transmits a speaker code to indicate the one of the participants determined who is the dominant speaker. This speaker code can be inserted into the header of one or more of the audio packets transmitted on the medium, or transmitted in a separate speaker code channel. The speaker code can be used by a client program to produce a visual indication of the speaker.

In accordance with another feature of the invention, a method is provided for transmitted speech through a teleconferencing system having an available bandwidth. The method includes: determining which of a plurality of participants is a dominant speaker; and, allocating a first portion of the available bandwidth to the detected dominant speaker and allocating a non-dominant participant into a second bandwidth portion of the available bandwidth.

In one embodiment, the method includes merging non-dominant speaker ones of the participants into a common portion of the available bandwidth.

BRIEF DESCRIPTION OF THE DRAWING

These and other features of the invention, as well as the invention itself, will become more readily apparent from the following detailed description when read together with the accompanying drawings, in which:

FIG. 2 is a diagram showing the flow of data through a sound server used in the system of FIG. 1, such data being transmitted to remote sites in such system; and FIG. 3 is a diagram of the flow of data to a user at one of the remote sites in the system of FIG. 1.

DESCRIPTION OF THE PREFERRED EMBODIMENTS

Figure 1:
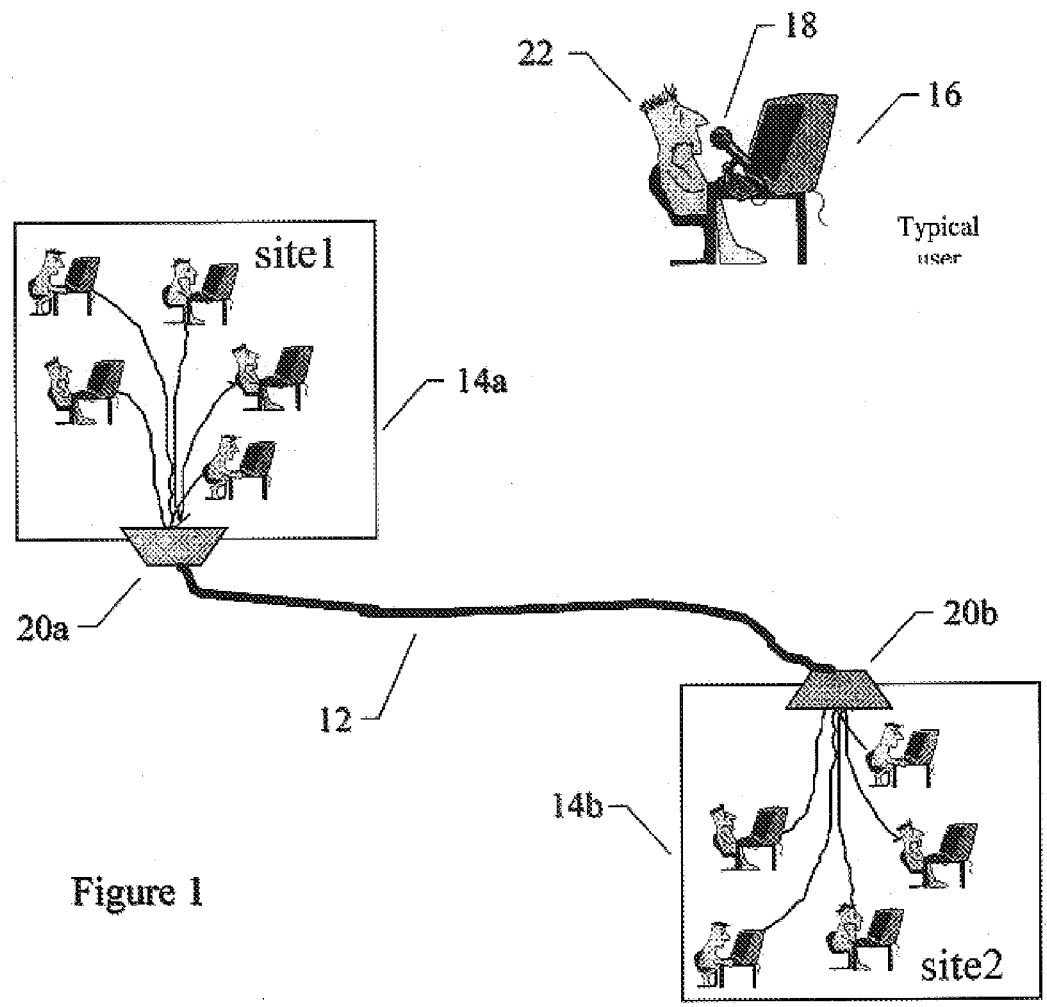
FIG. 1 is a diagram of a telecommunication system according to the invention.

Referring now to FIG. 1, a teleconferencing system 10 having a predetermined, limited available bandwidth is shown. The bandwidth is limited by the transmission medium 12, here, for example, an ISDN line or DSL. The system 10 is here shown to enable teleconferencing among participants at a plurality of, here two, remote sites 14a, 14b. But the invention is not limited to two sites. The sites 14a, 14b are interconnected through the transmission medium 12.

Here, each participant is at a personal computer 16, here a workstation, having a monitor, CPU, and microphone 18, as indicated, but could be any sort of device capable of recording, transmitting, receiving and playing audio at the required quality.

The computers 16 at each one of the sites 14a, 14b are coupled to a sound server 20a, 20b, as indicated. The sound servers 20a, 20b are coupled through the transmission medium 12, as shown. Each one of the sound servers 20a, 20b is identical in construction, exemplary ones thereof being shown in FIG. 2 for the portion used to place data on the medium 12 and in FIG. 3 for the portion used to receive the data on the medium 12. Each one of the sound servers 20a, 20b monitors audio streams that are transmitted to it in digital packets on a local area computer network (LAN). A typical configuration is shown in FIG. 1. In such configuration, participants 22 at the two geographically separated sites 14a, 14b are connected by a corresponding one of the sound servers 20a, 20b at each end of the transmission medium 12, here a dedicated channel such as ISDN or ASDL, as noted above. The sound servers 20a, 20b use, for example, a multi-rate coder (34, and also inside 20a and 20b) here about 32 kbps, to encode the wideband channel at 32 kbps and the narrowband channel at, for example, 24 kbps. The narrowband channel could be as "wide" as the broadband channel, if available, but we will still call it the narrowband channel for identification purposes. That is, the narrowband channel can be equal to or less than the wideband channel. The sound servers 20a, 20b accept packets of the LAN and sorts them into queues by source, in effect reassembling the streams from each other.

Referring to FIG. 2, the data flow from those streams through the modules of the sound sorter are shown. The audio packets may be compressed or uncompressed. If they are compressed, it is assumed that they are compressed so as to provide a higher quality for the wideband (i.e., dominant speaker) channel.

All incoming streams from the microphones 18 to the sound server 20a, 20b are routed into the speech detection module 30 (FIG. 2) which detects whether they are active (i.e., if it detects speech activity on the stream) or is inactive (i.e., otherwise). The inactive streams are discarded. The active streams are routed to the dominant speaker (DS) detection module 32 which selects the dominant speaker stream or streams based on a set of dynamically changeable criteria including volume, location, status, username and title (as is shown in Table 1 and will be described in the material following the table). Assuming there is only one dominant speaker stream, the dominant stream is routed directly to the wideband (i.e., high quality) coder in the codec module 34. All other active streams are merged, for example by analog summing, in the merge module 36 into a single composite stream 37. The composite stream 37 is routed into the narrowband coder in the codec module 34. The coded information includes speaker identification (i.e. a speaker number) into each packet header.

The codec module 36 contains encoding and decoding algorithms for at least one narrowband and one wideband encoding. Speech is encoded before transmission, and then it can be transmitted to the remote site. Decoding of the encoded streams results in two or more streams: one or more dominant-speaker streams and one merged-voice stream. It should be understood that if the bandwidth allows, more than one dominant speaker stream with individually encoded voices can be transmitted.

Available channel bandwidth is divided into channels according to the dictates of the transmission medium and the needs of the application. If sufficient audio bandwidth is available this bandwidth can be allocated to say two wideband channels and one narrow band channel where the first two speakers are individually encoded and transmitted on separate wideband channels and all the rest are combined and transmitted in a single narrowband channel. Alternately there could be one wideband and a number of narrowband channels where the dominant speaker is on the wideband channel and the next speakers are assigned to narrowband channels until just one channel is left and then subsequent speakers are summed together on the last channel. The motivation for the two channel system as an example is that when more than one speaker is talking at the time the result is generally that the conversation stops and is restarted. Here with two channels that might be carried on a right and left speaker, the dominant speaker might still be intelligible due to the well-known "cocktail party effect" or due to a higher volume setting on the dominant speaker, but the "noise" in the other channel signifying one or more speaker trying to interrupt is still available as a normal conversational turn-taking cue.

Once the system knows the available channels, it is straightforward for the DS detection module 32 to assign speakers to channels. With W wideband channels and 1 narrow-band channels, the DS detection module 32 would choose W highest scoring speakers and put each on a separate wideband channel. The rest of the speakers would be merged onto the single narrow-band channel. The score is a weighted combination of DS module parameters.

TABLE 1

| Speaker # | DS Module Parameters | | | | |
|---|---|---|---|---|---|
| | A | B | C | ... | N |
| Priority | 4 | 6 | 1 | ... | 12 |
| Volume | 0.8 | 1.2 | 1 | ... | 1.8 |
| Silence window (ms) | 500 | 500 | 900 | ... | 400 |
| Minimum guaranteed speaking time (mins) | 5 | 5 | 10 | ... | 6 |
| other parameters | ... | ... | ... | ... | ... |

Table 1 shows a sample of some parameters used by the DS detection module 32. These parameters, and the weighting or importance of each parameter, can be modified during the session dynamically by the session moderator by sending special session packets to the sound servers 20a, 20b. For example, when the DS detection module receives a session packet, it would update the specified parameter, thus changing the behavior of DS detection. In Table 1, speaker C has the highest priority, and C's silence window is 900 ms. That means that C readily becomes DS, and while DS she can stop speaking for up to 900 ms before the DS module decides she has finished speaking, and moves her off the wideband channel. Such a setting might be used to give a very important person easy access to the DS channel.

This ability to alter the parameters of the DS module allows the session moderator great control over the session. For example the silence window can be configured on an individual speaker basis, so system moderators can make it easier or harder for other speakers to "take the floor" away from the dominant speaker. Some people have longer pauses in their speech than others; this can vary on a regional basis, for example between slower-speaking southern Americans and faster-speaking northeastern Americans.

The moderator can raise or lower individual speaker volumes session-wide by controlling volumes as they go through SS. The session moderator can also select the dominant speaker directly, by commanding the DS module to put a certain speaker onto the wideband channel for a period of time with the highest priority and longest silence timeout.

Thus, as noted above, the sound servers 20a, 20b include a speech detector module 30 responsive to signals produced by the plurality of microphones 18, for passing speech produced by the microphones 18 from a speaking one, or ones, of the plurality of participants 22 while rejecting non-speaking participants 22. The speech detection module 30 may take many forms. Here, for example, the speech detection module performs a simple root-mean-square (RMS) calculation to determine the thresholds for speech activity on the audio stream. It is noted that here a plurality of sets of parameters is fed to the speech detection modules; one parameter set being associated with a corresponding one of the participants 22 as in Table 1. These parameters may be adjusted by the moderator thereby enabling the moderator to establish a different score for each participant for reasons to be described. If the audio data is compressed, activity can be determined from the coded data. Speech detection can be done on the sound server 20a, 20b or on the workstation of each participant 22. If the latter method is used activity on the local area network can be reduced by up to 50% since silent packets are not transmitted.

Figure 5:
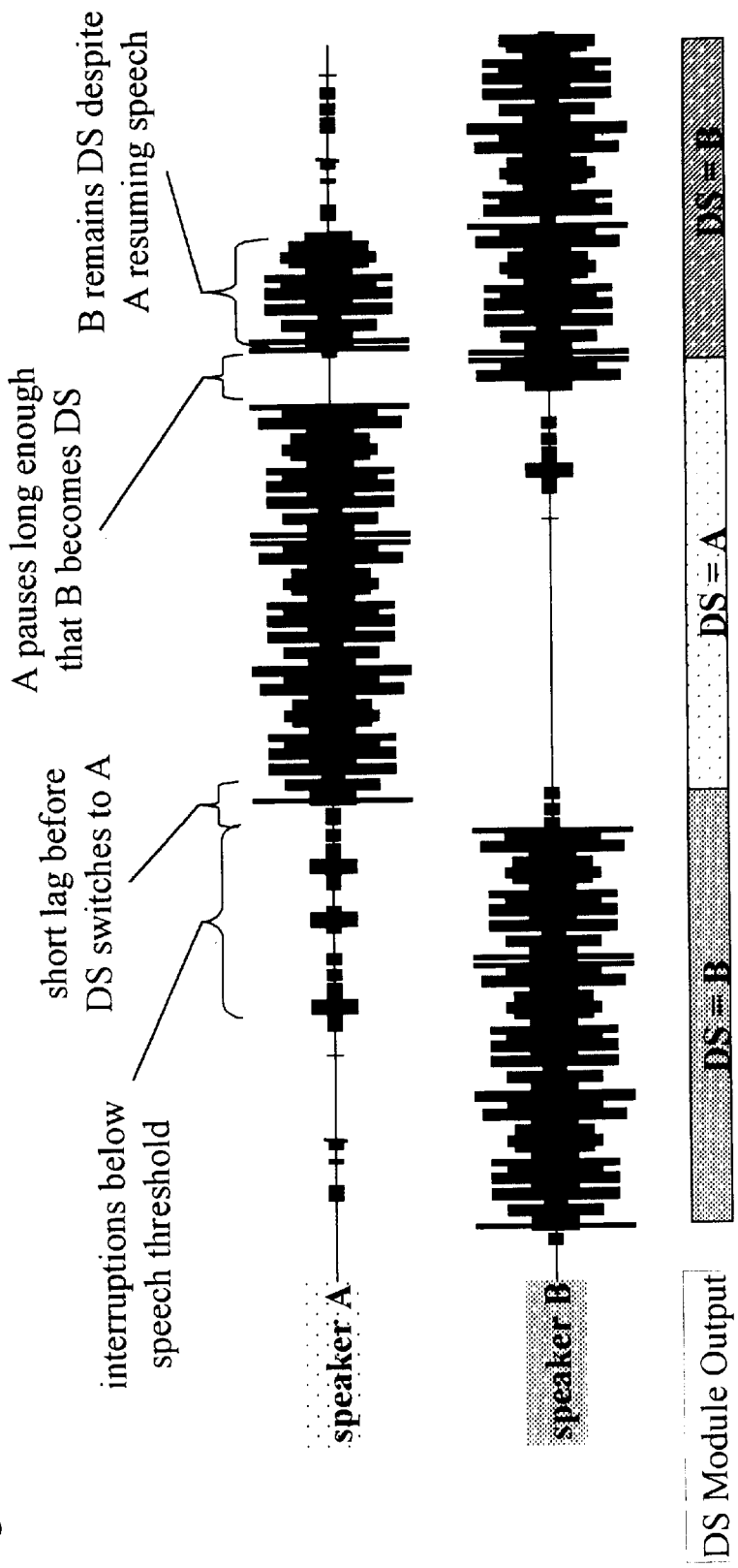
FIG. 5 is an illustration showing the audio of two speakers, and the output of the Dominant Speaker Detection Module used in the system of FIG. 1.

A dominant speaker detector module 32, responds to the speech from the one, or ones of the speaking participants 22 passed by the speech detector 30 and determines which of the detected speaking one, or ones, thereof is a dominant speaker and also produces a signal indication of the participants determined to be the dominant speaker. The dominant speaker module 32 keeps track of how long each speaker has been speaking. Some representative parameters are listed in Table 1, but there could be other factors, like how many other people are trying to interrupt. FIG. 5 shows a diagram, demonstrating the output of the DS module based on speech activity of two speakers, both with equal priority.

A bandwidth allocation module, here the codec 34, allocates a first portion of the available bandwidth to the detected dominant speaker, such detected speaker speech being transmitted in for example a relative wide bandwidth channel, and allocates a second, narrower or equal-sized, portion of the available bandwidth to one or more non-dominant speaker participants.

It is noted that a merger module 36 is provided for merging remaining speaking participants into a portion of the available bandwidth. In the merger module 36, several streams of speech are added together. The simplest implementation is to mix analog audio. The remaining speaker speech (i.e., the output of the merger module) is transmitted in a portion of the available bandwidth, for example a relatively narrow channel.

More particularly, the method and system encodes the speech of multiple speakers for transmission on a limited medium such as ISDN or ADSL. The system and method encode one or more "dominant" speakers on individual channels that are relatively wideband (e.g., a bandwidth of approximately 7–8 kHz and having low coding artifacts, i.e., a channel having twice that of the 4 kHz telephone), and merges all other speakers into a single other channel. A "dominant" speaker may be defined according to the needs of the application, but intuitively it is a speaker in a collaboration session who has the "floor". Each speaker at any moment is a candidate to be "dominant", replacing a current dominant speaker. "Speaking" is distinguished from audible attempts to interrupt the current speaker. The first speaker to break silence is placed on an individual relatively wideband channel and if someone else talks at the same time the second speaker is placed on a new channel. The new channel may be another wideband channel or a narrowband channel. The process repeats until the available bandwidth is consumed. Speakers who cannot be accommodated on individual wideband channels are summed (i.e., merged) into a single narrowband channel.

Thus, with such method and system, a strategy is provided for encoding multiple audio streams from the microphones onto several channels, with the dominant speaker being given the widest portion of the available bandwidth. In addition, the encoding includes identification of the participants who are speaking at each moment, and on which channels, thereby enabling use of such information, as for example, to visually identify the current speaker in a video teleconferencing application.

Speakers who are vocalizing, but not currently the "dominant" speaker, are assumed to be attempting to interrupt and become the dominant speaker. Thus, it is not the content of their speech that is important, but it is the ability to signal the current dominant speaker. That signal alternatively could be transmitted visually, but it is socially more natural to interrupt via speech. One advantage of the system is that any speaker who wants to interrupt can vocalize, yet the bandwidth is used where it is most important, i.e., on the main speaker, that is, on the dominant speaker. The merged speech on the narrowband channel won't be as clear as the speech on the wideband channel, but will be adequate for interruption.

Identification of the dominant speaker in a conference has many applications. For example, an image or the name of the dominant speaker could be identified to the participants in the conference. In the absence of spatialized sound, such identification can be helpful to cue participants who cannot see (via full-motion video, for example) who is speaking, or to localize the sound.

Figure 4:
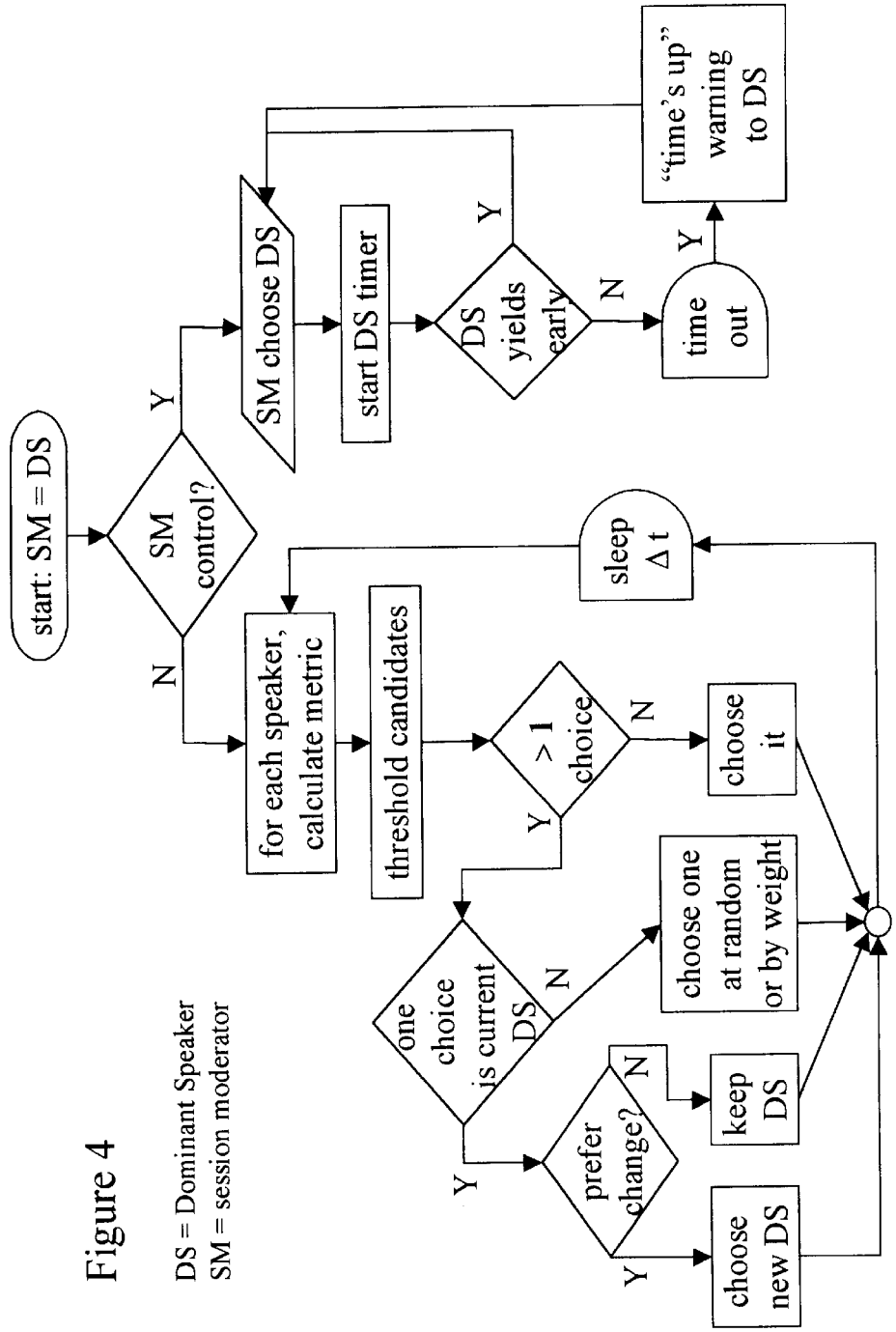
FIG. 4 is a flow diagram showing an algorithm used in a Dominant Speaker Detection Module used in the system of FIG. 1.

By controlling the definition of the dominant speaker (See flow diagram in FIG. 4), either before or during the meeting, a moderator can subtly control who "has the floor". Speakers who tend to dominate a collaboration session and are resistant to giving up the floor could be subtly urged to yield the floor by raising the volume of the other speakers who are trying to interrupt. As a final "nudge", the current dominant speaker could be switched to a narrowband channel and the interrupters could be swapped to the wideband channel to give their speech more "presence" until one of them wins the floor. Such control by the session manager was described above. Participants who are more shy and do not speak as much can be encouraged to speak up giving a conference moderator an ability to change the parameters, here the thresholds fed to the speech detection module 30, by which the dominant speaker selection module determines that those speakers have become dominant. The moderator could adjust the thresholds for becoming dominant so that the shy people or those who are more knowledgeable on the subject can more easily take the floor. This could be done on an individual basis, as the moderator finds that some of the speakers need to be encouraged and others discouraged.

Further, another adjustment to the dominant speaker selection module is a timing mechanism giving a speaker a predetermined period of time to speak before anyone is allowed to interrupt, after which it becomes progressively easier to interrupt. Control is in the SS, as outlined in the flow diagram in FIG. 4.

Other embodiments are within the spirit and scope of the appended claims.

What is claimed is:

1. A teleconferencing system having an available bandwidth, such system comprising:
    a dominant speaker detector, for determining which of a plurality of participants is at least one dominant speaker;
    a bandwidth allocator, having a wide bandwidth codec and a narrow bandwidth codec, for allocating a first portion of the available bandwidth to the determined dominant speaker and allocating a second portion of the available bandwidth to a non-dominant speaker participant; and
    wherein the wide bandwidth codec encodes signals from the dominant speaker to first portion of the bandwidth and the narrow bandwidth codec encodes signals from the non-dominant speaker to the second portion of the bandwidth.

2. The system recited in claim 1 including a merger for merging non-dominant speaker ones of the participants into a narrower bandwidth portion of the available bandwidth.

3. The system recited in claim 2 wherein the merger comprises a combiner for adding the speech of the non-dominant participants together into a composite signal.

4. The system recited in claim 3 wherein the bandwidth allocator comprises a codec for coding the dominate speaking participant speech into the wider portion of the available bandwidth and the composite signal into the narrower portion of the available bandwidth.

5. A teleconferencing system having an available bandwidth, such system comprising:
    a speech detector responsive to speech from a plurality of participants, for passing speech from a speaking one, or ones, of the plurality of participants while rejecting non-speaking participants;
    a dominant speaker detector, responding to the speech from the one, or ones of the speaking participants passed by the speech detector, for determining which of the detected speaking one, or ones, thereof is a dominant speaker;
    a bandwidth allocator, having a wide bandwidth codec and a narrow bandwidth codec, for allocating a first portion of the available bandwidth to the determined dominant speaker and allocating a second portion of the available bandwidth to a non-dominant speaker participant; and
    wherein the wide bandwidth codec encodes signals from the dominant speaker to first portion of the bandwidth and the narrow bandwidth codec encodes signals from the non-dominant speaker to the second portion of the bandwidth.

6. The system recited in claim 5 including a merger for merging non-dominant speaker ones of the participants into a narrower bandwidth portion of the available bandwidth.

7. A teleconferencing system having an available bandwidth, such system comprising;
    a plurality of microphones, each one being associated with a corresponding one of a plurality of participants;
    a dominant speaker detector, responsive to signals produced by the microphones, for determining which of a plurality of participants is a dominant speaker;
    a bandwidth allocator, having a wide bandwidth codec and a narrow bandwidth codec, for allocating a first portion of the available bandwidth to the determined dominant speaker and allocating a second portion of the available bandwidth to a non-dominant speaker participant; and
    wherein the wide bandwidth codec encodes signals from the dominant speaker to first portion of the bandwidth and the narrow bandwidth codec encodes signals from the non-dominant speaker to the second portion of the bandwidth.

8. The system recited in claim 7 including a merge module for merging non-dominant speaker ones of the participants into a portion of the available bandwidth.

9. The system recited in claim 8 wherein the merger comprises a combiner for adding the speech of the non-dominant participants together into a composite signal.

10. The system recited in claim 9 wherein the bandwidth allocator comprises a codec for coding the dominate speaking participant speech into the wider portion of the available bandwidth and the composite signal into the narrower portion of the available bandwidth.

11. A teleconferencing system having an available bandwidth, such system comprising:
    a plurality of microphones, each one being associated with a corresponding one of a plurality of participants;
    a speech detector responsive to signals produced by the plurality of microphones, for passing speech produced by the microphones from a speaking one, or ones, of the plurality of participants while rejecting non-speaking participants;
    a dominant speaker detector, responding to the speech from the one, or ones of the speaking participants passed by the speech detector, for determining which one of the detected speaking one, or ones, thereof is a dominant speaker and for producing a signal indication of the participants determined to be the dominant speaker;
    a bandwidth allocator, having a wide bandwidth codec and a narrow bandwidth codec, for allocating a first portion of the available bandwidth to the determined dominant speaker, such dominant speaker speech being transmitted in a relative wide bandwidth channel, and allocating a second portion of the available bandwidth to a non-dominant speaker participant;
    wherein the wide bandwidth codec encodes signals from the dominant speaker to first portion of the bandwidth and the narrow bandwidth codec encodes signals from the non-dominant speaker to the second portion of the bandwidth.

12. The system recited in claim 11 including a merger for merging remaining speaking participants into a narrower portion of the available bandwidth; and wherein the remaining speaker speech is transmitted in a relative narrow channel, and the signal indication of the participants determined is transmitted to be the dominant speaker in a speaker code channel.

13. A method for transmitted speech through a teleconferencing system having an available bandwidth, such method comprising:
    determining which of a plurality of participants is a dominant speaker;
    allocating a first portion of the available bandwidth to the determined dominant speaker and allocating a non-dominant participant into a second bandwidth portion of the available bandwidth; and
    wherein a wide bandwidth codec encodes signals from the dominant speaker to first portion of the bandwidth and a narrow bandwidth codec encodes signals from the non-dominant speaker to the second portion of the bandwidth.

14. The method recited in claim 13 including merging non-dominant speaker ones of the participants into a narrower bandwidth portion of the available bandwidth.

15. The method recited in claim 14 wherein the bandwidth allocator codes the dominate speaking participant speech into the wider portion of the available bandwidth and the composite signal into the narrower portion of the available bandwidth.

16. A method of transmitting speech through a teleconferencing system having an available bandwidth, such method comprising:

passing speech from a speaking one, or ones, of the plurality of participants while rejecting non-speaking participants;

responding to the speech from the one, or ones of the speaking participants passed by the speech detector, and determining which of the detected speaking one, or ones, thereof is a dominant speaker;

allocating a first portion of the available bandwidth to the determined dominant speaker and allocating a non-dominant participant into a second bandwidth portion of the available bandwidth; and wherein a wide bandwidth codec encodes signals from the dominant speaker to first portion of the bandwidth and a narrow bandwidth codec encodes signals from the non-dominant speaker to the second portion of the bandwidth.

17. The method recited in claim 16 including merging non-dominant speaker ones of the participants into a narrower bandwidth portion of the available bandwidth.

18. A method for transmitting speech through a teleconferencing system having an available bandwidth, such method comprising:

providing a plurality of microphones, each one being associated with a corresponding one of a plurality of participants;

responding to signals produced by the microphones and determining, from such signals, which of a plurality of participants is a dominant speaker;

allocating a first portion of the available bandwidth to the determined dominant speaker and allocating a non-dominant participant into a second bandwidth portion of the available bandwidth; and wherein a wide bandwidth codec encodes signals from the dominant speaker to first portion of the bandwidth and a narrow bandwidth codec encodes signals from the non-dominant speaker to the second portion of the bandwidth.

19. The method recited in claim 18 including merging non-dominant speaker ones of the participants into a narrower bandwidth portion of the available bandwidth.

20. The system recited in claim 19 including coding the dominate speaking participant speech into the first portion of the available bandwidth and the composite signal into the second portion of the available bandwidth.

21. A method for transmitting speech through a teleconferencing system having an available bandwidth, such method comprising:

providing a plurality of microphones, each one being associated with a corresponding one of a plurality of participants;

responding to signals produced by the plurality of microphones and passing speech produced by the microphones from a speaking one, or ones, of the plurality of participants while rejecting non-speaking participants;

responding to the speech from the one, or ones of the speaking participants passed by a speech detector, to determine which of the determined speaking one, or ones, thereof is a dominant speaker;

producing a signal indication of the participants determined to be the dominant speaker;

allocating a first portion of the available bandwidth to the determined dominant speaker, such dominant speaker speech being transmitted in a first bandwidth channel;

merging remaining speaking participants into a second portion of the available bandwidth;

transmitting the remaining speaking participants speech transmitting the signal indication of the participants determined to be the dominant speaker in a speaker code channel or coded into the audio data itself; and wherein a wide bandwidth codec encodes signals from the dominant speaker to first portion of the bandwidth and a narrow bandwidth codec encodes signals from the non-dominant speaker to the second portion of the bandwidth.

22. A method for transmitted speech through a teleconferencing system having an available bandwidth, such method comprising:

determining which of a plurality of participants is a dominant speaker, such determination being in response to parameters selectable by a moderator;

allocating a first portion of the available bandwidth to the determined dominant speaker and allocating a non-dominant participant into a second bandwidth portion of the available bandwidth; and wherein a wide bandwidth codec encodes signals from the dominant speaker to first portion of the bandwidth and a narrow bandwidth codec encodes signals from the non-dominant speaker to the second portion of the bandwidth.

* * * * *

UNITED STATES PATENT AND TRADEMARK OFFICE
CERTIFICATE OF CORRECTION

PATENT NO. : 6,804,340 B2
DATED : October 12, 2004
INVENTOR(S) : Michael D. Howard et al.

It is certified that error appears in the above-identified patent and that said Letters Patent is hereby corrected as shown below:

Title page,
Item [75], Inventors, delete "Ronald R. Burns" and replace with -- Ronnie R. Burns --.
Item [57], ABSTRACT,
Line 3, delete "encode" and replace with -- encodes --.

Column 4,
Line 2, delete "available this" and replace with -- available, this --.
Line 13, delete "time the" and replace with -- time, the --.
Line 19, delete "speaker" and replace with -- speakers --.

Column 5,
Line 24, delete "used activity" and replace with -- used activity --.

Column 6,
Lines 3 and 4, delete "time the" and replace with -- time, the --.

Column 10,
Line 26, delete "speech" and replace with -- speech; --.

Signed and Sealed this

Eighteenth Day of January, 2005

JON W. DUDAS
*Director of the United States Patent and Trademark Office*